United States Patent
Arth et al.

(10) Patent No.: US 8,965,057 B2
(45) Date of Patent: Feb. 24, 2015

(54) SCENE STRUCTURE-BASED SELF-POSE ESTIMATION

(75) Inventors: Clemens Arth, Judendorf-Straßengel (AT); Gerhard Reitmayr, Graz (AT); Dieter Schmalstieg, Graz (AT)

(73) Assignee: QUALCOMM Incorporated, San Diego, CA (US)

(*) Notice: Subject to any disclaimer, the term of this patent is extended or adjusted under 35 U.S.C. 154(b) by 315 days.

(21) Appl. No.: 13/547,987

(22) Filed: Jul. 12, 2012

(65) Prior Publication Data

US 2013/0230214 A1 Sep. 5, 2013

Related U.S. Application Data

(60) Provisional application No. 61/606,209, filed on Mar. 2, 2012.

(51) Int. Cl.
*G06K 9/00* (2006.01)

(52) U.S. Cl.
USPC .......................................................... 382/107

(58) Field of Classification Search
None
See application file for complete search history.

(56) References Cited

U.S. PATENT DOCUMENTS

| | | | |
|---|---|---|---|
| 2005/0169543 A1* | 8/2005 | Damera-Venkata | 382/236 |
| 2005/0190972 A1* | 9/2005 | Thomas et al. | 382/218 |
| 2008/0109184 A1 | 5/2008 | Aratani et al. | |
| 2010/0045701 A1 | 2/2010 | Scott et al. | |
| 2011/0129118 A1* | 6/2011 | Hagbi et al. | 382/103 |
| 2012/0038549 A1 | 2/2012 | Mandella et al. | |

FOREIGN PATENT DOCUMENTS

| | | |
|---|---|---|
| EP | 1594322 A2 | 11/2005 |
| WO | WO2012037994 A1 | 3/2012 |
| WO | WO2012040099 | 3/2012 |

OTHER PUBLICATIONS

Mehta et al (Daisy Chaining Based Visual Servo Control Part I: Adaptive Quaternion-Based Tracking Control, IEEE 2007).*
Arth C., et al., "Full 6DOF Pose Estimation from Geo-Located Images", ACCV 2012 (LNCS 7726), vol. III, Nov. 5, 2012, pp. 705-707, XP055061145.
International Search Report and Written Opinion—PCT/US2013/023669—ISA/EPO—Jun. 5, 2013.
Zhang W., et al., "Image Based Localization in Urban Environments", 3D Data Processing, Visualization and Transmission, Third International Symposium on IEEE, PI, Jun. 1, 2006, pp. 33-40, XP031078921.

(Continued)

*Primary Examiner* — Amara Abdi
(74) *Attorney, Agent, or Firm* — Silicon Valley Patent Group LLP

(57) ABSTRACT

Pose estimation is performed using a scene structure captured in a query image and reference images from a database. Each of the reference images has an associated position estimate. Direction vectors are generated that describe directions between an unknown position of a camera center for the query image and a reference camera center for each reference image based on the query image and the plurality of reference images. The direction vectors may be generated using, e.g., homographies, essential matrices, or fundamental matrices. A pose estimation with six degrees of freedom is determined using the direction vectors and the associated position estimate for each reference image. The pose estimation, for example, may be determined by solving a three-point pose problem using the direction vectors and the associated position estimate for each reference image.

21 Claims, 6 Drawing Sheets

(56) References Cited

OTHER PUBLICATIONS

Arth, et al., "Challenges of Large-Scale Augmented Reality on Smartphones," ISMAR, 2011, pp. 1-4.
Arth, et al., "Real-time self-localization from panoramic images on mobile devices", IEEE International Symposium on Mixed and Augmented Reality, Science and Technolgy Proceedings, 2011, pp. 37-46.
Arth, et al., "Wide Area Localization on Mobile Phones", IEEE International Symposium on Mixed and Augmented Reality, Science and Technology Proceedings, 2009, pp. 73-82.
Baatz, et al., "Handling Urban Location Recognition as a 2D Homothetic Problem," EECV, 2010, pp. 266-279.
Chen, et al., "City-Scale Landmark Identification on Mobile Devices," CVPR, 2011, pp. 737-744.
Haralick, et al., "Review and Analysis of Solutions of the Three Point Perspective Pose Estimation Problem," International Journal of Computer Vision, Kluwer Academic Publishers, 1994, pp. 331-356, vol. 13, No. 3.
Hile, et al., "Landmark-Based Pedestrian Navigation with Enhanced Spatial Reasoning," International Conference on Pervasive Computing, 2009, pp. 59-76.
Irschara et al., "From Structure-from-Motion Point Clouds to Fast Location Recognition," CVPR, 2009, pp. 2599-2606.
Nister, et al., "A Minimal Solution to the Generalised 3-Point Pose Problem," Journal of Math Imaging and Vision, 2007, pp. 67-79, vol. 27.
Zamir, et al., "Accurate Image Localization Based on Google Maps Street View," EECV, 2010, pp. 255-268.

* cited by examiner

SCENE STRUCTURE-BASED SELF-POSE ESTIMATION

CROSS-REFERENCE TO PENDING PROVISIONAL APPLICATION

This application claims priority under 35 USC 119 to U.S. Provisional Application No. 61/606,209, filed Mar. 2, 2012, and entitled "Scene Structure-Based Self-Pose Estimation" which is assigned to the assignee hereof and which is incorporated herein by reference.

BACKGROUND

1. Background Field

Embodiments of the subject matter described herein are related generally to position and tracking, and more particularly to vision based tracking.

2. Relevant Background

Pose estimation describes the task of determining the external calibration of a camera with respect to an environment, which may be known or unknown. Recently image based pose estimation methods have been proven to be a good choice for solving the task of achieving a highly accurate six degrees of freedom (6DOF) pose estimation. Image based pose estimation traditionally requires some reconstruction or 3D model of the scene. The use of sparse 3D models is advantageous in terms of accuracy and speed when it comes to online pose estimation; however, the building of these models is usually a complex offline process. Thus, the scalability and maintainability of the required 3D models, however, remains an unsolved problem.

SUMMARY

Pose estimation is performed using a scene structure captured in a query image and reference images from a database. Each of the reference images has an associated position estimate. Direction vectors are generated that describe directions between an unknown position of a camera center for the query image and a reference camera center for each reference image based on the query image and the plurality of reference images. The direction vectors may be generated using, e.g., homographies, essential matrices, or fundamental matrices. A pose estimation with six degrees of freedom is determined using the direction vectors and the associated position estimate for each reference image. The pose estimation, for example, may be determined by solving a three-point pose problem using the direction vectors and the associated position estimate for each reference image.

In one implementation, a method includes receiving a query image of a scene captured with a camera; receiving a plurality of reference images of the scene from a database, each reference image having an associated position estimate; generating direction vectors describing directions between an unknown position of a camera center for the query image and a reference camera center for each reference image based on the query image and the plurality of reference images; and using the direction vectors and the associated position estimate for each reference image to determine a pose of the camera with six-degrees of freedom.

In one implementation, an apparatus includes a first interface capable of receiving a query image of a scene captured with a camera; a second interface capable of receiving a plurality of reference images of the scene from a database, each reference image having an associated position estimate; and a processor coupled to receive the query image from the first interface and the plurality of reference images from the second interface, the processor configured to generate direction vectors describing directions between an unknown position of a camera center for the query image and a reference camera center for each reference image based on the query image and the plurality of reference images, and to use the direction vectors and the associated position estimate for each reference image to determine a pose of the camera with six-degrees of freedom.

In one implementation, an apparatus includes means for receiving a query image of a scene captured with a camera; means for receiving a plurality of reference images of the scene from a database, each reference image having an associated position estimate; means for generating direction vectors describing directions between an unknown position of a camera center for the query image and a reference camera center for each reference image based on the query image and the plurality of reference images; and means for using the direction vectors and the associated position estimate for each reference image to determine a pose of the camera with six-degrees of freedom.

In one implementation, a non-transitory computer-readable medium including program code stored thereon, includes program code to receive a query image of a scene captured with a camera; program code to receive a plurality of reference images of the scene from a database, each reference image having an associated position estimate; program code to generate direction vectors describing directions between an unknown position of a camera center for the query image and a reference camera center for each reference image based on the query image and the plurality of reference images; and program code to use the direction vectors and the associated position estimate for each reference image to determine a pose of the camera with six-degrees of freedom.

DETAILED DESCRIPTION

Figure 1A:
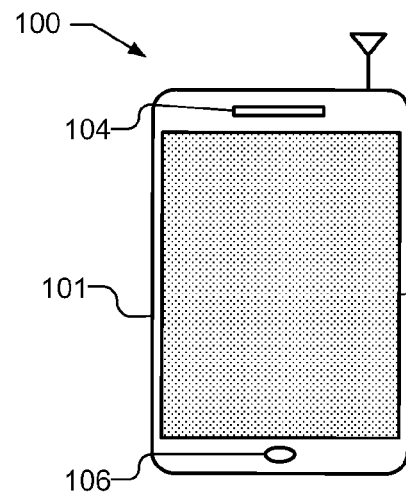
FIGS. 1A and 1B below illustrate a front side and back side, respectively, of a mobile device capable of using scene structure based pose estimation.
Figure 1B:
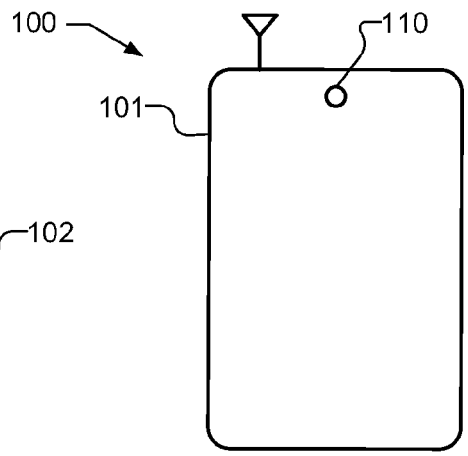

FIGS. 1A and 1B below illustrate a front side and back side, respectively, of a mobile device 100 capable of using scene structure based pose estimation to determine a 6DOF pose without the need for 3D reconstruction. As described herein, pose estimation is performed using a scene structure captured in a query image and reference images from a database. Each of the reference images has an associated position estimate. For example, for the pairs formed by the query image and each of these reference images, the epipolar geometry is estimated using image features, e.g., such as SIFT (Scale-Invariant-Feature-Transform). From known epipolar geometry, the epipole may be obtained and, together with the known position of the reference image, may be treated as a single 2D-3D correspondence for the query image. Based on at least three reference images, the standard three-point pose problem may be used. The full 6DOF pose of the query camera may be estimated in a global context, e.g., by applying a RANSAC (RANdom SAmple Consensus) based scheme in a robust solver. This approach stands in contrast to estimating the pose of a camera from real world points and their image observations. The known reference camera positions are treated as the world points and the placement of the cameras relative to the query camera as the observations.

As illustrated in FIG. 1, the mobile device 100 includes a housing 101, a display 102, which may be a touch screen display, as well as a speaker 104 and microphone 106. The mobile device 100 further includes a forward facing camera 110 to image the environment. The mobile device 100 captures an image of a scene, e.g., as a frame of video, and uses the image with geo-tagged reference images from a database to determine the position of the mobile device 100. The mobile device 100 uses the geo-tagged reference images with the captured query image to determine a 6DOF pose estimation based on multiple homographies, essential or fundamental matrices.

As used herein, a mobile device refers to any portable electronic device such as a cellular or other wireless communication device, personal communication system (PCS) device, personal navigation device (PND), Personal Information Manager (PIM), Personal Digital Assistant (PDA), or other suitable mobile device. The mobile device may be capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all electronic devices, including wireless communication devices, computers, laptops, tablet computers, etc. capable of capturing images (or video) of its environment.

Figure 2:
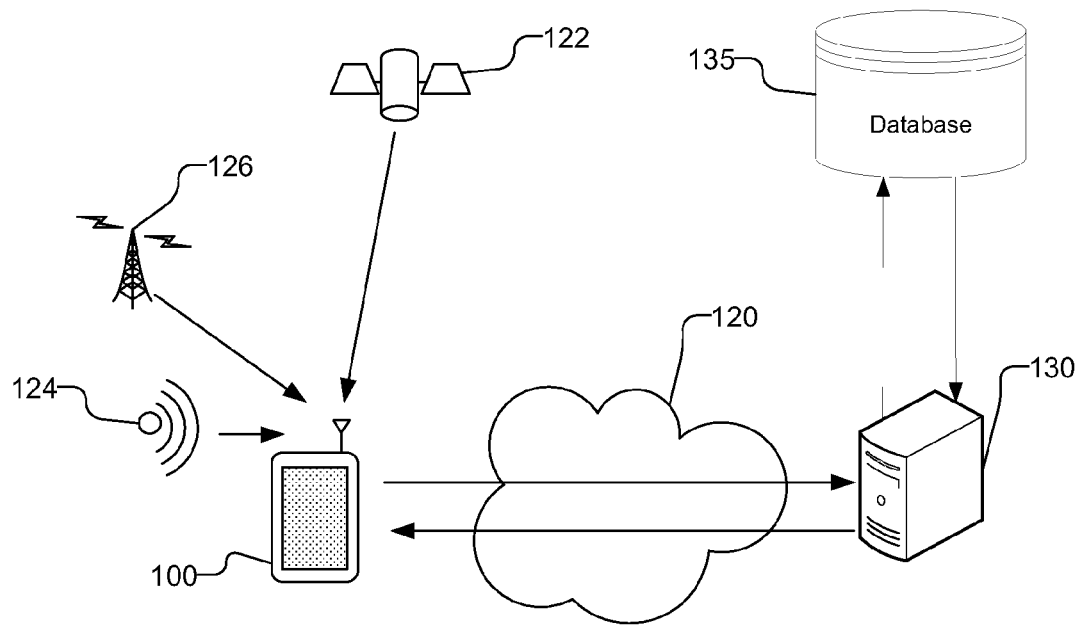
FIG. 2 illustrates a block diagram showing a system in which a mobile device accesses a database to obtain reference images for scene structure based pose estimation.

FIG. 2 illustrates a block diagram showing a system in which a mobile device 100 may access a database 135 using remote server 130 via a wireless network 120. The database 135 may include geo-tagged reference images. Relevant sets of geo-tagged reference images may be located in database 135, e.g., based on imaging matching or using a rough position estimate for the query image. The rough position estimate for the query image may be obtained from the mobile device 100 using conventional positioning techniques, such as a rough GPS measurement using satellite positioning system (SPS) 122, or trilateration using wireless sources such as access points 124 or cellular towers 126. An SPS system 122 of transmitters is positioned to enable entities to determine their location on or above the Earth based, at least in part, on signals received from the transmitters. In a particular example, such transmitters may be located on Earth orbiting satellite vehicles (SVs), e.g., in a constellation of Global Navigation Satellite System (GNSS) such as Global Positioning System (GPS), Galileo, Glonass or Compass or other non-global systems. Thus, as used herein an SPS may include any combination of one or more global and/or regional navigation satellite systems and/or augmentation systems, and SPS signals may include SPS, SPS-like, and/or other signals associated with such one or more SPS.

The mobile device 100 may also provide the query image (or a feature set from the query image) to the server 130, and the workload of finding a relevant set of geo-tagged reference images will be performed on the server 130, as well as any other desired processes described herein. Alternatively, the server 130 may provide a set of reference images, or a pre-calculated feature set for each reference image, to the mobile device 100 and the mobile device 100 may perform the processes described herein. Additionally, a database of reference images, or a pre-calculated feature set for the reference images, may be stored on the mobile device 100, thereby obviating the need to access the remote server 130 through the network 120.

Figure 3:
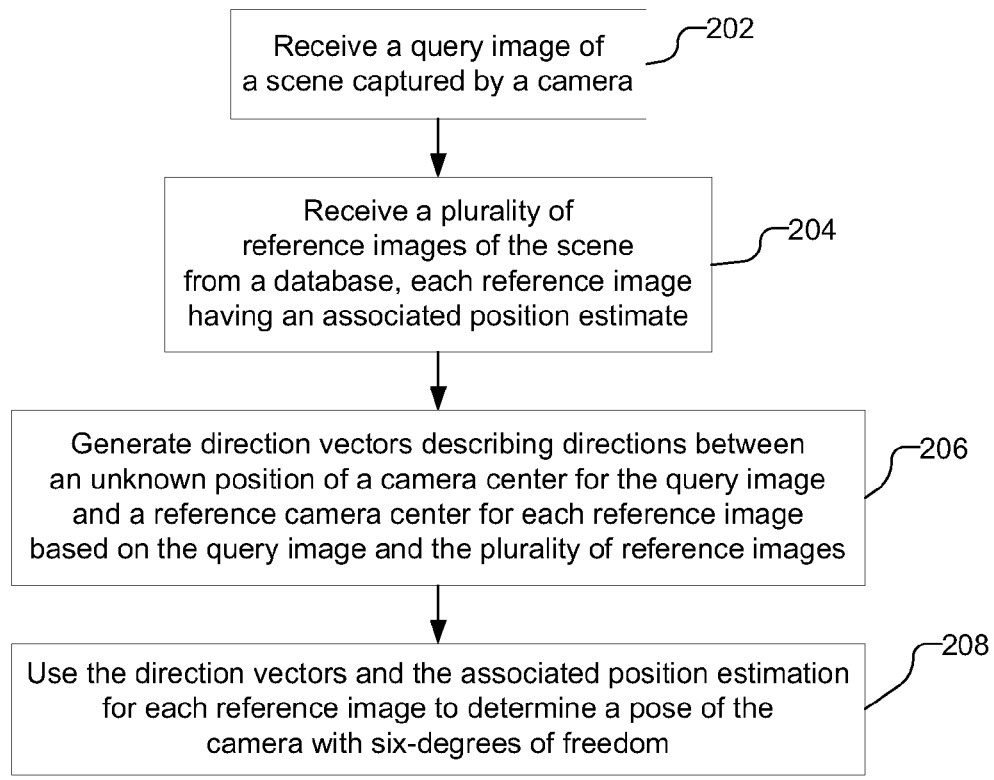
FIG. 3 is a flow chart illustrating a method of determining a 6DOF pose using a database of images.

FIG. 3 is a flow chart illustrating a method of determining a 6DOF pose using a database of images. As illustrated, a query image I of a scene that is captured by a camera is received (202). The query image may be, e.g., a frame of video. For example, where the server 130 performs the pose estimation process, the query image I may be received by the server 130 from the mobile device 100 via network 120. If the mobile device 100 performs the pose estimation process, the query image I may be received, e.g., by the processor in the mobile device 100 from the camera 110. The query image may have an associated position estimate, i.e., an approximate position estimate of the camera center that captured the query image, which may be obtained during or close to the time of capturing the query image. The associated position estimate associated with the query image may be obtained using known positioning techniques, including GPS measurement or trilateration using wireless sources, and is therefore an approximate position limited to the accuracy of positioning techniques, e.g., 10 to 50 feet for GPS type measurements.

A plurality of reference images I' of the scene is received from a database, each reference image having an associated position estimate (204). For example, where the server 130 performs the pose estimation process, the plurality of reference images I' may be received by a processor in the server 130 from the database 135. If the mobile device 100 performs the pose estimation process, the plurality of reference images I' may be received by the mobile device 100 from the database 135 via server 130 and network 120. The associated position estimate for each reference image may not include an associated orientation. Thus, for example, based on the associated position estimate of the query image, a first set of N relevant images S may be collected by filtering the database. Each reference image in the first set S has an associated position estimate that is near the position estimate associated with query image. An acceptable distance between the position estimate for query image and the position estimate for each reference image may be dependent on factors such as the location, e.g., a greater distance may be used for the Grand Canyon than in a city, as well as availability of reference images, e.g., a greater distance may be acceptable if there are few reference images or the scene structure is far away. For example, a scene structure may be far away if it is typically imaged from a large distance, e.g., the Statue of Liberty is typically photographed from boats from a large distance. With each reference image in the first set S being located near the position from which the query image was taken, it is likely that some of these reference images will depict the same scene. The set of reference images may be refined to include only reference images that depict the same scene as the query image. For example, the first set of relevant images S may be filtered to produce a second set of relevant images S' by comparing features in the query image to features in each reference image in the first set of reference images and geometrically verifying matching features. By way of example, for all image pairs formed by the query image and the references images, the epipolar geometry may be estimated using image features. A robust scheme for outlier removal may be used due to possible errors that result from the feature matching.

Three-dimensional (3D) direction vectors are generated that describe directions between an unknown position of a camera center for the query image I and a reference camera center for each reference image I' based on the query image I and the plurality of reference images I' (206). In other words, the relative translation between the query camera C and the reference camera C' is determined. The direction vectors may be generated based on the epipolar geometry extracted from the query image I and each reference image I' using, e.g., fundamental matrices, essential matrices, or homographies. The direction vectors and the associated position estimation for each reference image are used to determine a pose of the camera with six-degrees of freedom (208). For example, the pose of the camera with six-degrees of freedom may be determined by solving a three-point pose problem using the direction vectors and the associated position estimation for each reference image.

Figure 4:
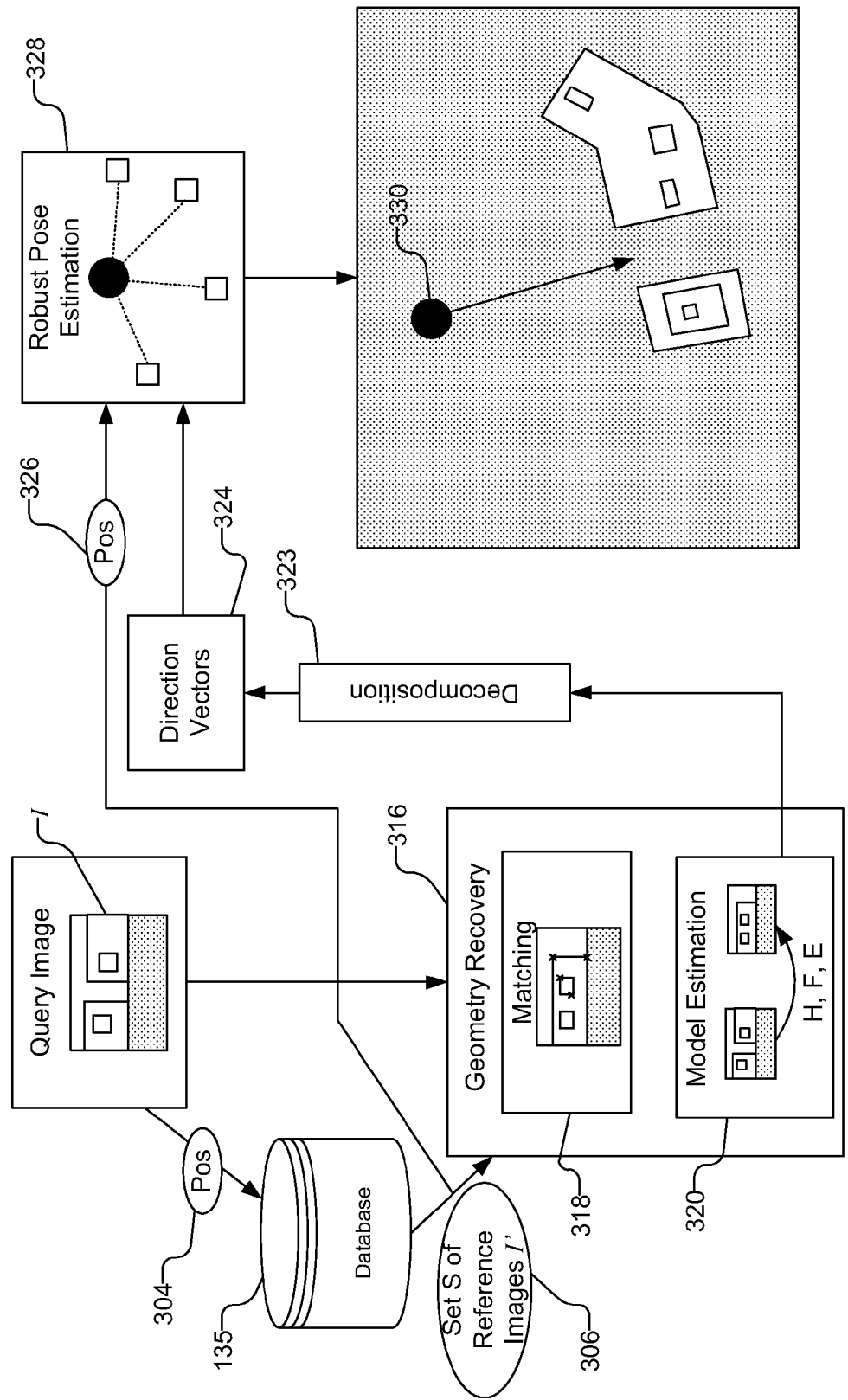
FIG. 4 schematically illustrates the determination of a 6DOF pose using a database of images.

FIG. 4 schematically illustrates the determination of a 6DOF pose using a database of images. As illustrated, a query image I is captured and a rough position estimate 304 for the query image I is used to obtain set S of reference images I' 306 from a database 135.

Figure 5:
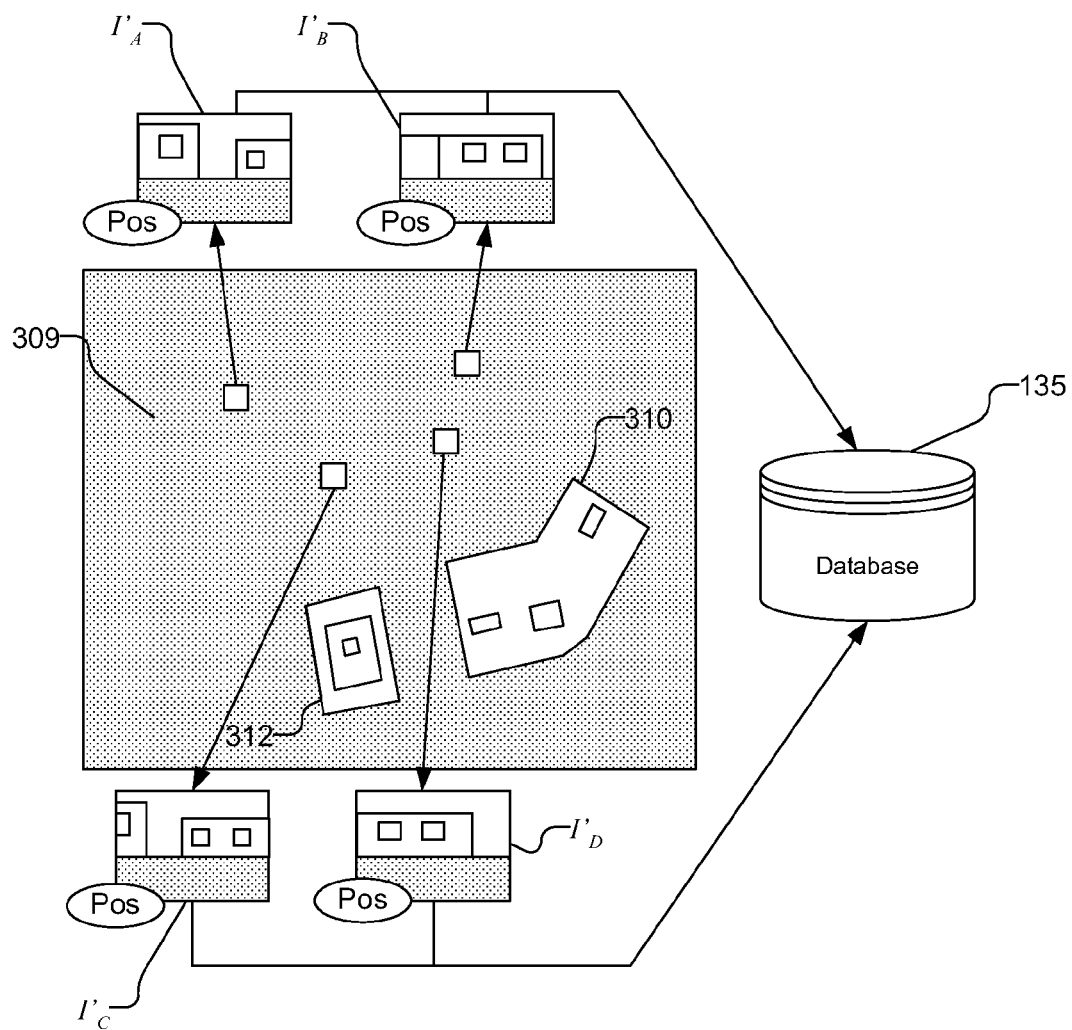
FIG. 5 schematically illustrates generating a database of reference images.

FIG. 5, by way of example, schematically illustrates generation of the database 135. FIG. 5 illustrates a top view of scene 309 that includes buildings 310, 312, with the positions at which a number of images $I'_A$, $I'_B$, $I'_C$, and $I'_D$ (sometimes collectively referred to as images I') identified by squares in the scene 309. The images I' as well as an associated position estimate (pos) of the camera when image was taken are provided to and stored in the database 135. If desired, additional information associated with the images I', such as the internal camera calibrations may also be stored in the database. If desired, the database 135 may store only extracted features from the images I', rather than the entire image itself.

The query image I and the set S of reference images I' are provided for geometry recovery 316. As discussed above, the initial set of reference images, which may be generated using a rough position estimate of the query image I, may be refined through matching 318 of image features from images I and I' extracted using, e.g., SIFT, SURF (Speeded Up Robust Feature), etc. The matching 318 process may be performed while calculating an epipolar geometry between image pairs. Model estimation 320 generates the relative poses between each image pair I and I' as e.g., fundamental matrices F, essential matrices E, or homographies H.

In general, if no information about the cameras is known, the fundamental matrix F may be determined, whereas, if the internal calibration K is know for the camera, the essential matrix E can be determined. If, in addition, it can be assumed that there is a dominant plane in the scene, the induced homography H may be determined. Additionally, the minimal number of correspondences required are reduced with additional information, e.g., fundamental matrix F requires at least 7, while the essential matrix requires 5, and a homography H requires only 4.

The epipolar geometry between image pairs, e.g., the query image I and each of the reference images I', described by the fundamental matrix F, may be estimated using image features such as e.g., SIFT (Scale Invariant Feature Transforms), SURF (Speeded Up Robust Feature), etc. For two images I and I', an arbitrary scene feature point X is depicted as observations x in I and x' in I'. By matching the descriptors of the observations x and x', a correspondence between images I and I' is established. For a large number of image features, an entire set of correspondences may be obtained in this way. Any reference image that has less than a threshold of features matching the query image may be discarded from the set S. The threshold may depend on a number of factors, including: a) the scene depicted, b) the estimated performance of the features employed, and c) the number of initial matches. A good heuristic is to accept pairs that have at least the number of correspondences that are required for the algorithm to later estimate fundamental matrices F, essential matrices E, or homographies H, e.g., homographies may use 4+1, while fundamental matrices F, essential matrices E may use 8+1 if the standard 8-point algorithm is employed.

The fundamental matrix F encapsulates the full intrinsic projective geometry of the query camera C and a reference camera C' and can be estimated from at least six correspondences between query image I and reference image I' using nonlinear optimization. Eight correspondences may be used in a linear least squares manner. The fundamental matrix F is a 3×3 matrix such that for observations $x_i$ and $x'_i$ of a single scene point $X_i$ in images I and I'

$$x'^T_i F x_i = 0. \qquad \text{eq. 1}$$

Alternatively, if the internal camera calibrations K and K' of both the query camera C and the reference camera C' are known, the camera calibration inverses may be applied to the points to obtain their normalized coordinates as $$\hat{x}_i = K^{-1} x_i \text{ and } \hat{x}'_i = K'^{-1} x'_i. \qquad \text{eq. 2}$$

From the normalized coordinates, the essential matrix E can be estimated as a specialized form of the fundamental matrix F such that $$\hat{x}'^T_i E \hat{x}_i = 0. \qquad \text{eq. 3}$$

The essential matrix E can be estimated from at least five correspondences between the query image I and the reference image I' and is related to the fundamental matrix F by $$E = K^T F K \qquad \text{eq. 4}$$

Due to the presence of errors in the set of correspondences between images I and I', the estimation of either the fundamental matrix F or essential matrix E may be performed robustly employing RANSAC.

Based on the epipolar geometry between the query image I and a reference image I', the relative translation between the query camera C and the reference camera C' may be determined, thereby providing 3D direction vectors 324 in FIG. 4 as the fundamental matrices, essential matrices. For example, information about the relative translation C' with respect to C, i.e., direction vectors, can be extracted as follows.

The right null vector of F is the epipole e, which is basically the observation of the reference camera C' in image I. Effectively, the epipole e describes the direction under which the reference camera C' is seen from the query camera C. After normalizing the epipole e by the internal calibration K of the query camera C, $$\hat{e} = K^{-1} e \qquad \text{eq. 5}$$

describes the direction in the coordinate system of the query camera C on which the reference camera C' must reside. Equivalently, if it is possible to estimate the essential matrix E for images I and I', the epipole ê can directly be calculated as the right null vector of E. A sign ambiguity is present after decomposition, and thus, the fundamental matrix F and the essential matrix E provide an undirected vector.

In addition to the use of the fundamental matrix or essential matrix to derive direction vectors 324, model estimation 320 based on homographies may be used to generate the direction vectors 324 between the unknown position of the query image and the estimated position associated with each reference image. Where the scene has a dominant planar structure, which are common in man-made environments, and the internal calibration K and K' of both the query camera C and the reference camera C' are known, homography may be employed rather than epipolar geometry to estimate the relative placement of cameras with respect to each other.

Given a single physical plane Π, a minimum of four correspondences between I and I' is sufficient for the estimation of a 2D homography H. Homography H encapsulates a 2D projective transformation between query image I and reference image I' that is valid for the single underlying plane Π. For arbitrary scene points $X_i$ on Π, the 3×3 matrix H transforms the point's observation $\hat{x}_i$ in I to its observation $\hat{x}'_i$ in I' such that $$H\hat{x}_i = \hat{x}'_i. \qquad \text{eq. 6}$$

Similar to epipolar geometry, the homography H encodes the relative pose change P between the query camera C and the reference camera C':

$$P = [R|t], \qquad \text{eq. 7}$$

where R and t denote the rotational and translational parts of the pose change respectively. Let H denote the homography between the query image I and I', then $$H = R + \frac{1}{d} t n^T \qquad \text{eq. 8}$$

with d being the distance from the query camera C to the given plane Π, and n being the normal vector of Π with respect to the query camera C, and R and t are the relative rotation and translation of the reference camera C' with respect to query camera C. Decomposition 323 of the matrix H from equation 8 is performed, where, for numerical stability, H is normalized prior to decomposition such that det(H)=1. As a result, two physically possible solutions for R, t, d and n are computed.

The real translation between the query camera C and the reference camera C' cannot be inferred completely from H. However, considering the position of a particular reference camera C', t defines a direction along which the query camera C must reside. The translation t can be transformed into the coordinate system of the query camera C, obtaining $$v = -R^T t \qquad \text{eq. 9}$$

where v denotes the direction vector 324 of reference camera C' with respect to the coordinate system of query camera C. Similarly to the direction vectors 324 obtained using a fundamental matrix or essential matrix, described above, the direction vectors 324 generated using homography may then be used, along with the positions estimates 326 of the reference images I' for a robust pose estimation 328 of the query camera C with six degrees of freedom.

With the direction vectors 324 that describe the directions between the unknown position of the query image I to each associated position estimate of the reference images I' and the position estimates 326 associated with each of the reference images I', a robust pose estimation 328 of the query camera C may be performed using the three point pose problem. For pinhole camera models, a known camera calibration K allows conversion of the image measurements $x_i$ to rays $v_i$ and their pairwise angle $\angle(v_i; v_j)$ can be measured. In the pinhole camera model, three known 3D points $X_i$ and their corresponding image measurements $x_i$ give rise to three pairwise angular measurements. These are sufficient to compute a finite number of solutions for the camera location and orientation. To determine the plausibility of a solution, a fourth observation of a 3D point is used.

Unlike the pinhole camera model, however, the present case does not operate in the image space. In other words, rays $v_i$ are the estimated direction vectors $\hat{e}_i$ for the reference cameras $C'_i$ are obtained either as epipoles from fundamental matrix F or essential matrix E or as translation directions obtained from homography H. The reference cameras $C'_i$ have the known 3D points $X_i$. The pairwise angle measurements $\angle(\hat{e}_i; \hat{e}_j)$ can be calculated, which leads to the same equation system as in the pinhole camera case. For three known reference camera positions $C'_i$, the pairwise 3D point distances $l_{i,j}$ can be computed. Furthermore, the angles $\theta_{i,j}$ are known from the corresponding direction vectors $\hat{e}_i$ and $\hat{e}_j$. The unknowns are the distances $d_i$ between the center of the query camera C (the equivalent for the center of projection in the pinhole case) and the camera center $C'_i$:

$$l_{i,j} = \|C'_i - C'_j\|$$

$$\theta_{i,j} = \angle(\hat{e}_i, \hat{e}_j) \qquad \text{eq. 10}$$

$$d_i = \|C - C'_i\|.$$

Using the law of cosines, each of the three point pairs gives one equation:

$$l_{i,j}^2 = C'^2_i + C'^2_j - 2C'_i C'_j \cos(\theta_{i,j}) \qquad \text{eq. 11}$$

Equation 11 is the same polynomial system as in the case of the conventional pinhole camera model and can be solved with the same techniques, where the difference is that in the pinhole camera model case the camera calibration matrix K is used to convert image measurements to vectors and therefore pairwise Euclidean angle measurements, while in the present case, rays are defined by the translational part of the differential poses.

There is a sign ambiguity in the direction under which the reference camera C' is seen by query camera C. Implementations of the standard three point pose algorithm uses directed rays, which ignores the possibility of 3D points lying behind the camera center. One way to overcome this issue is to modify the implementation accordingly, considering the negative roots of the quartic as valid solutions. This would then possibly give poses that are partially point mirrored. Those may be validated by checking for a negative determinant of the rotation component. Alternatively, the generalized three-point pose algorithm as is known by those skilled in the art might be used since it implicitly works on undirected rays at negligible additional cost and returns the same solutions.

At least three point-ray pairs are needed to solve the problem, while a fourth pair is used to verify the physical plausibility of the solution. Thus, theoretically a full 6-DOF pose may be calculated for the query camera C using a minimum of four reference images I', in practice, however, it may be desirable to solve the problem using 10 or more reference images I'. Moreover, a robust estimation scheme employing RANSAC may be used as the direction estimates delivered by the homography, essential matrix and fundamental matrix provide two possible solutions.

Thus, the problem of full 6-DOF pose estimation is solved without having an explicit reconstruction of the scene at hand, and without the need to reconstruct the scene explicitly. The accuracy of the solution is directly dependent on the number of reference images I' and the quality of the geometric estimate. Thus the computational effort for geometric recover 316 (i.e. homography, essential or fundamental matrix estimation) can be scaled for different levels of accuracy.

Figure 6:
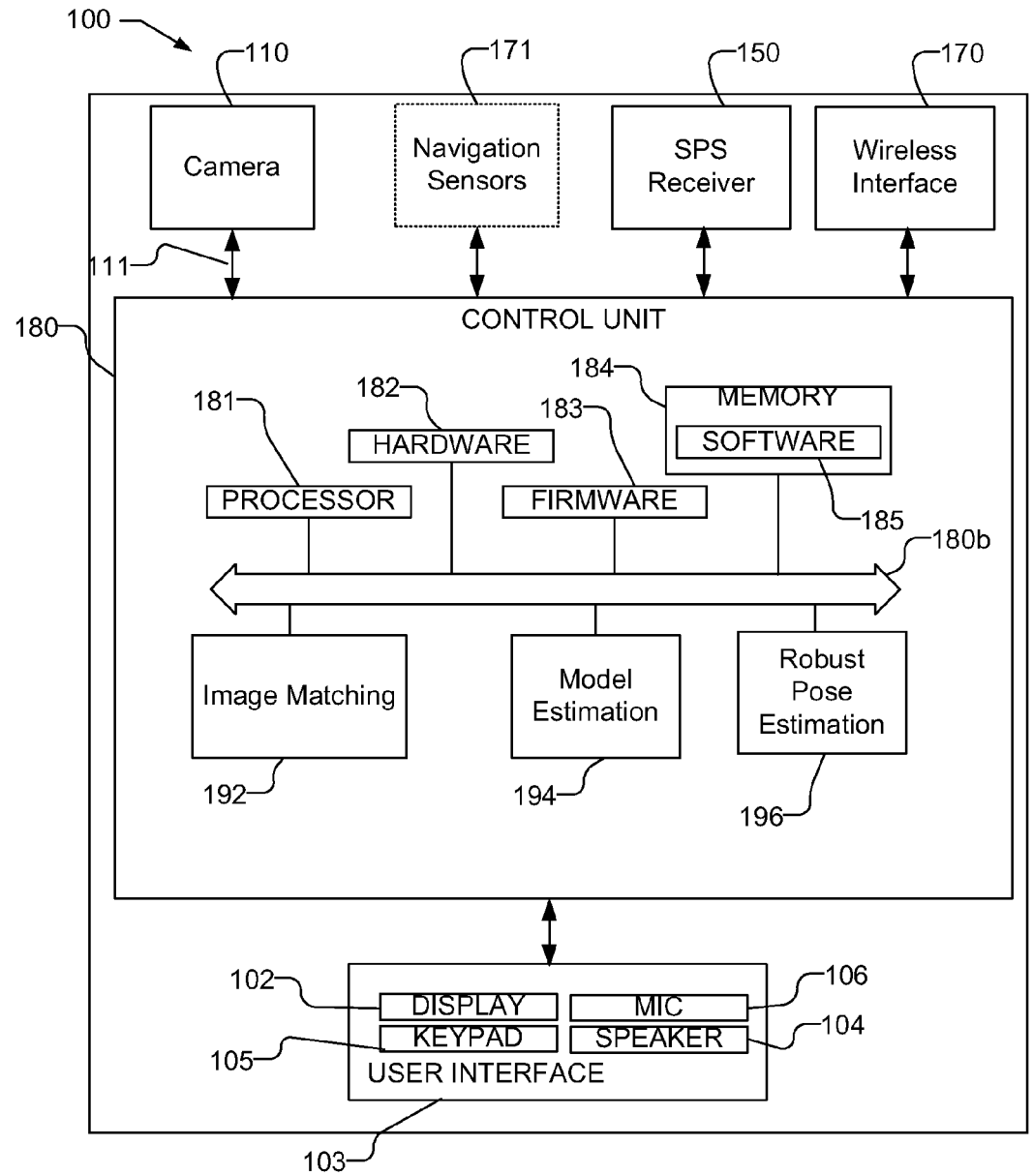
FIG. 6 is a block diagram of a mobile device capable of using scene structure based pose estimation.

FIG. 6 is a block diagram of a mobile device 100 capable of determining a 6DOF pose using a database of images. The mobile device 100 includes a camera 110 for capturing images. The mobile device 100 may further include a wireless interface 170 for receiving wireless signals from network 120 (shown in FIG. 2). The wireless interface 170 may use various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. Moreover, any combination of WWAN, WLAN and/or WPAN may be used.

The mobile device 100 may optionally include non-visual navigation sensors 171, such motion or position sensors, e.g., accelerometers, gyroscopes, electronic compass, or other similar motion sensing elements. The use of navigation sensors 171 may assist in multiple actions of the methods described above.

The mobile device 100 may further includes a user interface 103 that includes a display 102, a keypad 105 or other input device through which the user can input information into the mobile device 100. If desired, the keypad 105 may be obviated by integrating a virtual keypad into the display 102 with a touch sensor. The user interface 103 may also include a microphone 106 and speaker 104, e.g., if the mobile device 100 is a mobile device such as a cellular telephone. Of course, mobile device 100 may include other elements unrelated to the present disclosure.

Figure 7:
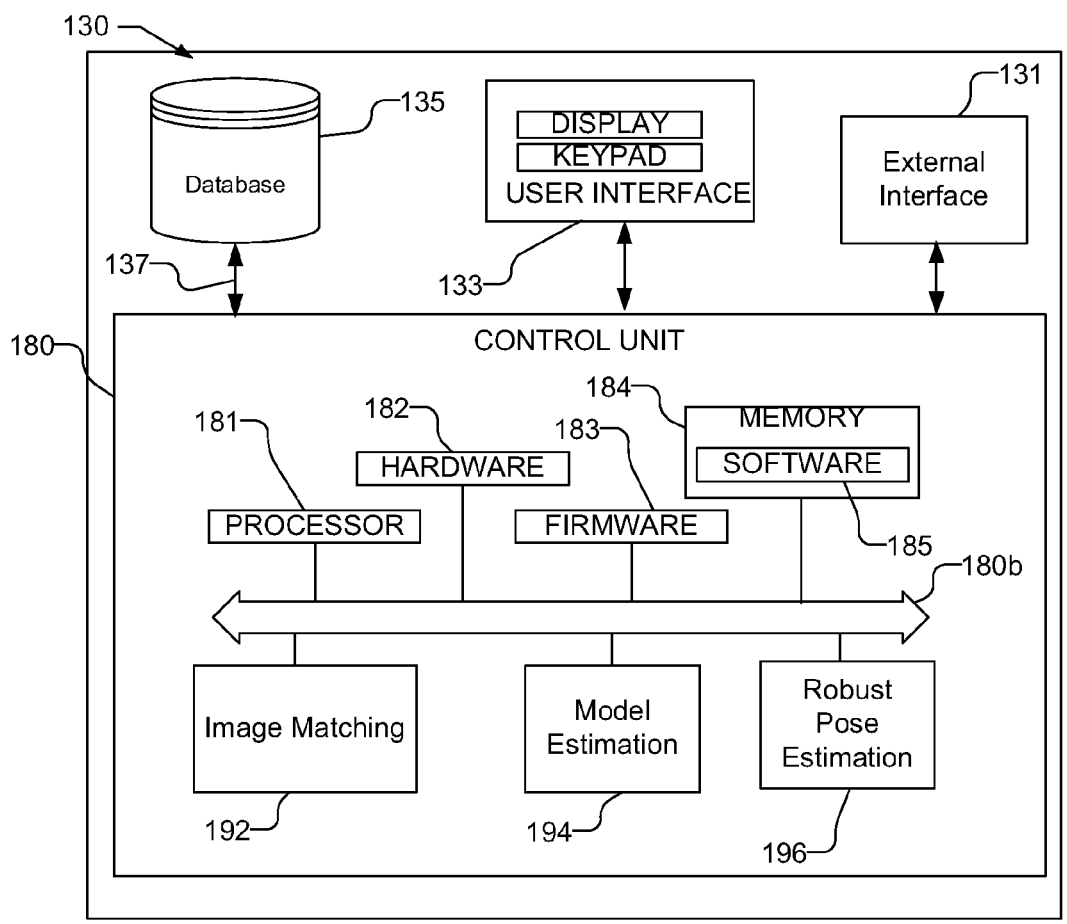
FIG. 7 illustrates a block diagram of server capable of determining a 6DOF pose using a database of images.

FIG. 7 illustrates a block diagram of server 130, which may be similar to mobile device 100 and capable of determining a 6DOF pose using a database of images. Server 130 includes an external interface 131 that is used to communicate with the mobile device 100 via network 120. The external interface 131 may be a wired interface to a router (not shown) or a wireless interface used in any various wireless communication networks. The server 130 may further include a user interface 133 that may include e.g., a display, as well as a keypad or other input device through which the user can input information into the server 130. The server 130 is further illustrated as including database 135, but it should be understood that database 135 may be external to the server 130.

Both mobile device 100 and server 130 are illustrated as including a control unit that is connected to receive the query image from the camera 110 in mobile device and the database 135 in server 130. As illustrated in FIG. 6, the control unit 180 is coupled to the camera 110, SPS receiver 150, the wireless interface 170 and navigation sensors 171, if included. In mobile device 100, the control unit 180 accepts and processes data from the camera 110 via a first interface 111, as well as reference images I' received from the database 135 via a second interface, i.e., wireless interface 170, as discussed above. As illustrated in FIG. 7, the control unit is coupled to the external interface 131, the user interface 133, and the database 135. Thus, in server 130 the control unit 180 accepts and processes the data from the camera 110 via a first interface 111, i.e., external interface 131, as well as the reference images I' from the database 135 via a second interface 137, as discussed above.

The control unit 180 in either mobile device 100 or server 130, may be provided by a bus 180b, processor 181 and associated memory 184, hardware 182, software 185, and firmware 183. The control unit 180 may include an image matching unit 192 that extracts and matches features between the query image I and reference images I' and model estimation unit 194 that produces the direction vectors between a query image I and reference images I' using, e.g., fundamental matrices, essential matrices, or homographies, as discussed above. Additionally, a robust pose estimation unit 196 that determines the 6DOF pose using the direction vectors and the position estimates associated with the reference images I'. The image matching unit 192, model estimation unit 194 and robust pose estimation unit 196 are illustrated separately and separate from processor 181 for clarity, but may be a single unit and/or implemented in the processor 181 based on instructions in the software 185 which is run in the processor 181. It will be understood as used herein that the processor 181, as well as one or more of the image matching unit 192, model estimation unit 194 and robust pose estimation unit 196 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

Thus, both the mobile device 100 and server 130 include means for receiving a query image of a scene captured with a camera, which may be e.g., the interface 111 in mobile device 100 or the external interface 131 in server 130. A means for receiving a plurality of reference images of the scene from a database, each reference image having an associated position estimate may be the wireless interface 170 in mobile device 100 or the interface 137 in the server 130. Means for generating direction vectors describing directions between an unknown position of a camera center for the query image and a reference camera center for each reference image based on the query image and the plurality of reference images may be, e.g., the model estimation unit 194 or processor 181 performing instructions received from software 185. Means for using the direction vectors and the associated position estimate for each reference image to determine a pose of the camera with six-degrees of freedom may be the robust pose estimation unit 196 or processor 181 performing instructions received from software 185.

The methodologies described herein may be implemented by various means depending upon the application. For example, these methodologies may be implemented in hardware 182, firmware 183, software 185, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 184 and executed by the processor 181. Memory may be implemented within or external to the processor 181.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   receiving a query image of a scene captured with a camera;
   receiving a plurality of reference images of the scene from a database, each reference image having an associated position estimate, wherein the associated position estimate for each reference image does not include an associated orientation;
   generating direction vectors describing directions between an unknown position of a camera center for the query image and a reference camera center for each reference image based on the query image and the plurality of reference images; and
   using the direction vectors and the associated position estimate for each reference image to determine a pose of the camera with six-degrees of freedom.

2. The method of claim 1, wherein generating the direction vectors describing directions between the camera center for the query image and the reference camera center for each reference image comprises using at least one of homographies, essential matrices, and fundamental matrices.

3. The method of claim 1, wherein the pose of the camera with six-degrees of freedom is determined by solving a three-point pose problem using the direction vectors and the associated position estimate for each reference image.

4. The method of claim 1, wherein receiving the plurality of reference images of the scene from the database comprises:
   using an approximate position of the camera when the query image is captured to produce a first set of reference images; and
   filtering the first set of reference images to produce the plurality of reference images by matching features in the query image to features in each reference image.

5. The method of claim 1, wherein each reference image has an associated camera calibration, wherein generating the direction vectors uses the associated camera calibration for each reference image.

6. An apparatus comprising:
   a first interface capable of receiving a query image of a scene captured with a camera;
   a second interface capable of receiving a plurality of reference images of the scene from a database, each reference image having an associated position estimate, wherein the associated position estimate for each reference image does not include an associated orientation; and
   a processor coupled to receive the query image from the first interface and the plurality of reference images from the second interface, the processor configured to generate direction vectors describing directions between an unknown position of a camera center for the query image and a reference camera center for each reference image based on the query image and the plurality of reference images, and to use the direction vectors and the associated position estimate for each reference image to determine a pose of the camera with six-degrees of freedom.

7. The apparatus of claim 6, wherein the apparatus further comprises the camera, and wherein the first interface is an interface between the camera and the processor and the second interface is a wireless interface.

8. The apparatus of claim 6, wherein the first interface is a wireless interface and the second interface is an interface between the database and the processor.

9. The apparatus of claim 6, wherein the processor is configured to generate the direction vectors describing directions between the camera center for the query image and the reference camera center for each reference image using at least one of homographies, essential matrices, and fundamental matrices.

10. The apparatus of claim 6, wherein the processor is configured to determine the pose of the camera with six-degrees of freedom by solving a three-point pose problem using the direction vectors and the associated position estimate for each reference image.

11. The apparatus of claim 6, wherein the processor is further configured to filter the plurality of reference images by matching features in the query image to features in each reference image.

12. The apparatus of claim 6, wherein each reference image has an associated camera calibration, wherein generating the direction vectors uses the associated camera calibration for each reference image.

13. An apparatus comprising:
   means for receiving a query image of a scene captured with a camera;

means for receiving a plurality of reference images of the scene from a database, each reference image having an associated position estimate, wherein the associated position estimate for each reference image does not include an associated orientation;

means for generating direction vectors describing directions between an unknown position of a camera center for the query image and a reference camera center for each reference image based on the query image and the plurality of reference images; and means for using the direction vectors and the associated position estimate for each reference image to determine a pose of the camera with six-degrees of freedom.

14. The apparatus of claim 13, wherein the means for generating the direction vectors describing directions between the camera center for the query image and the reference camera center for each reference image uses at least one of homographies, essential matrices, and fundamental matrices.

15. The apparatus of claim 13, wherein the pose of the camera with six-degrees of freedom is determined by solving a three-point pose problem using the direction vectors and the associated position estimate for each reference image.

16. The apparatus of claim 13, wherein the means for receiving the plurality of reference images of the scene from the database uses an approximate position of the camera when the query image is captured to produce a first set of reference images; and filters the first set of reference images to produce the plurality of reference images by matching features in the query image to features in each reference image.

17. The apparatus of claim 13, wherein each reference image has an associated camera calibration, wherein the means for generating the direction vectors uses the associated camera calibration for each reference image.

18. A non-transitory computer-readable medium including program code stored thereon, comprising:

program code to receive a query image of a scene captured with a camera;

program code to receive a plurality of reference images of the scene from a database, each reference image having an associated position estimate, wherein the associated position estimate for each reference image does not include an associated orientation;

program code to generate direction vectors describing directions between an unknown position of a camera center for the query image and a reference camera center for each reference image based on the query image and the plurality of reference images; and program code to use the direction vectors and the associated position estimate for each reference image to determine a pose of the camera with six-degrees of freedom.

19. The non-transitory computer-readable medium of claim 18, wherein the program code to generate the direction vectors describing directions between the camera center for the query image and the reference camera center for each reference image uses at least one of homographies, essential matrices, and fundamental matrices.

20. The non-transitory computer-readable medium of claim 18, wherein the pose of the camera with six-degrees of freedom is determined by solving a three-point pose problem using the direction vectors and the associated position estimate for each reference image.

21. The non-transitory computer-readable medium of claim 18, wherein the program code to receive the plurality of reference images of the scene from the database comprises:

program code to use an approximate position of the camera when the query image is captured to produce a first set of reference images; and program code to filter the first set of reference images to produce the plurality of reference images by matching features in the query image to features in each reference image.

* * * * *